United States Patent
Toyoda

(10) Patent No.: US 10,523,049 B2
(45) Date of Patent: Dec. 31, 2019

(54) UNINTERRUPTIBLE POWER SUPPLY APPARATUS

(71) Applicant: TOSHIBA MITSUBISHI-ELECTRIC INDUSTRIAL SYSTEMS CORPORATION, Chuo-ku (JP)

(72) Inventor: Masaru Toyoda, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 341 days.

(21) Appl. No.: 15/529,341

(22) PCT Filed: Dec. 25, 2014

(86) PCT No.: PCT/JP2014/084228
§ 371 (c)(1),
(2) Date: May 24, 2017

(87) PCT Pub. No.: WO2016/103379
PCT Pub. Date: Jun. 30, 2016

(65) Prior Publication Data
US 2017/0279302 A1 Sep. 28, 2017

(51) Int. Cl.
*H02J 9/06* (2006.01)
(52) U.S. Cl.
CPC ................... *H02J 9/062* (2013.01)
(58) Field of Classification Search
None
See application file for complete search history.

(56) References Cited

U.S. PATENT DOCUMENTS

| 5,172,009 A * | 12/1992 | Mohan | H02J 9/062 307/105 |
| 5,315,533 A * | 5/1994 | Stich | H02J 9/062 307/66 |

(Continued)

FOREIGN PATENT DOCUMENTS

| CN | 100358216 C | 12/2007 |
| CN | 101035388 B | 6/2012 |

(Continued)

OTHER PUBLICATIONS

Extended Search Report dated Jul. 16, 2018 in European Patent Application No. 14908986.4.

(Continued)

*Primary Examiner* — Jared Fureman
*Assistant Examiner* — James P Evans
(74) *Attorney, Agent, or Firm* — Oblon, McClelland, Maier & Neustadt, L.L.P.

(57) ABSTRACT

An uninterruptible power supply apparatus supplies AC power from any one of a first inverter of a first power conversion device and a second inverter of a second power conversion device to a load, and when this inverter has a malfunction, the uninterruptible power supply apparatus supplies the AC power from the other inverter to the load. When a DC voltage provided to the second inverter is higher than a lower limit voltage, the second power conversion device outputs an AC voltage having a sinusoidal waveform and falling within an acceptable input voltage range of the load, and when the DC voltage is lower than the lower limit voltage, the second power conversion device outputs an AC voltage having waveform distortion within a range acceptable to the load and falling within the acceptable input voltage range of the load.

19 Claims, 10 Drawing Sheets

(56) References Cited

U.S. PATENT DOCUMENTS

| | | | | |
|---|---|---|---|---|
| 6,304,006 B1* | 10/2001 | Jungreis | ................... | H02J 3/38 |
| | | | | 307/64 |
| 7,259,477 B2* | 8/2007 | Klikic | ................... | H02J 9/062 |
| | | | | 307/14 |
| 9,608,443 B2* | 3/2017 | Chung | ................... | H02J 3/32 |
| 2009/0072623 A1* | 3/2009 | Liao | ................... | H02J 9/061 |
| | | | | 307/65 |
| 2010/0026093 A1* | 2/2010 | Bleus | ................... | H02J 9/062 |
| | | | | 307/24 |
| 2011/0006607 A1* | 1/2011 | Kwon | ................... | G06F 1/30 |
| | | | | 307/66 |
| 2011/0012429 A1* | 1/2011 | Fornage | ................... | H02M 3/285 |
| | | | | 307/82 |
| 2012/0026764 A1* | 2/2012 | Giuntini | ................... | H02J 9/005 |
| | | | | 363/69 |
| 2012/0217809 A1* | 8/2012 | Sato | ................... | H02J 9/062 |
| | | | | 307/64 |
| 2014/0054965 A1* | 2/2014 | Jain | ................... | H02J 3/46 |
| | | | | 307/65 |
| 2015/0035359 A1 | 2/2015 | Chung | | |
| 2015/0054343 A1 | 2/2015 | Cui | | |
| 2016/0006295 A1* | 1/2016 | Yang | ................... | H02J 9/062 |
| | | | | 307/66 |

FOREIGN PATENT DOCUMENTS

| | | | | |
|---|---|---|---|---|
| CN | 102893492 A | | 1/2013 | |
| CN | 103368231 A | | 10/2013 | |
| JP | 2008278558 A | * | 11/2008 | ........... H02M 7/487 |
| JP | 2010-124557 A | | 6/2010 | |
| JP | 2014107931 A | * | 6/2014 | |
| KR | 10-1322617 B | | 10/2013 | |

OTHER PUBLICATIONS

International Search Report dated Mar. 31, 2015 in PCT/JP2014/084228 filed Dec. 25, 2014.
Office Action dated May 17, 2019 in Chinese Application No. 201480084309.1, along with an English translation.
Office Action dated Sep. 24, 2019 in Indian Application No. 201717024866.

* cited by examiner

UNINTERRUPTIBLE POWER SUPPLY APPARATUS

TECHNICAL FIELD

The present invention relates to an uninterruptible power supply apparatus, and particularly to an uninterruptible power supply apparatus that receives the AC power from first and second AC power sources.

BACKGROUND ART

Conventionally, an uninterruptible power supply apparatus includes a converter configured to convert AC power supplied from a first AC power source to DC power, an inverter configured to convert the DC power to AC power, and a switching circuit configured to provide any one of the AC power generated by the inverter and the AC power supplied from a second AC power source to a load. When the AC power is being supplied from the first AC power source, the DC power generated by the first converter is stored in a battery and supplied to the inverter, and the AC power generated by the inverter is supplied to the load.

In a power failure state in which the supply of the AC power from the first AC power source is stopped, the DC power of the battery is supplied to the inverter and the AC power generated by the inverter is supplied to the load. When the inverter has a malfunction, the AC power supplied from the second AC power source is supplied to the load through the switching circuit. Therefore, even when the power failure occurs or even when the inverter has a malfunction, the operation of the load can be continued. Such uninterruptible power supply apparatus is disclosed in, for example, Japanese Patent Laying-Open No. 2010-124557 (PTD 1).

CITATION LIST

Patent Document

PTD 1: Japanese Patent Laying-Open No. 2010-124557

SUMMARY OF INVENTION

Technical Problem

In the conventional uninterruptible power supply apparatus, an output voltage of the second AC power source is directly applied to the load when the inverter has a malfunction. Therefore, when the output voltage of the second AC power source increases above an acceptable input voltage range of the load, the load may be broken. Conversely, when the output voltage of the second AC power source falls below the acceptable input voltage range of the load, the operation of the load may stop.

Accordingly, a main object of the present invention is to provide an uninterruptible power supply apparatus in which the operation of a load can be continued even when an inverter has a malfunction and an output voltage of an AC power source varies.

Solution to Problem

An uninterruptible power supply apparatus according to the present invention includes first and second power conversion devices. The first power conversion device includes: a first converter configured to convert AC power supplied from a first AC power source to DC power; a first inverter configured to convert DC power to AC power; and a first controller configured to control the first converter and the first inverter such that an output voltage of the first power conversion device becomes an AC voltage. When the AC power is supplied from the first AC power source, the DC power generated by the first converter is stored in a power storage device and supplied to the first inverter, and when the supply of the AC power from the first AC power source is stopped, the DC power of the power storage device is supplied to the first inverter. The second power conversion device includes: a second converter configured to convert AC power supplied from a second AC power source to DC power; a second inverter configured to convert the DC power generated by the second converter to AC power; and a second controller configured to control at least the second inverter, of the second converter and the second inverter, such that: (i) in a first case in which a DC voltage provided to the second inverter is higher than a predetermined first voltage, an output voltage of the second power conversion device becomes an AC voltage having a sinusoidal waveform and falling within an acceptable input voltage range of a load; and (ii) in a second case in which the DC voltage provided to the second inverter is lower than the predetermined first voltage, the output voltage of the second power conversion device becomes an AC voltage having waveform distortion within a range acceptable to the load and falling within the acceptable input voltage range of the load. The AC power is supplied from any one of the first and second inverters to the load, and the AC power is supplied from the other inverter to the load when the one inverter has a malfunction.

Advantageous Effects of Invention

In the uninterruptible power supply apparatus according to the present invention, in addition to the first power conversion device including the first converter and the first inverter, the second power conversion device including the second converter and the second inverter and configured to output the AC voltage falling within the acceptable input voltage range of the load is provided, and the AC power is supplied from any one of the first and second inverters to the load, and when this inverter has a malfunction, the AC power is supplied from the other inverter to the load. Therefore, even when the first or second inverter has a malfunction and the AC voltage of the AC power source varies, the operation of the load can be continued.

DESCRIPTION OF EMBODIMENTS

First Embodiment

Figure 1:
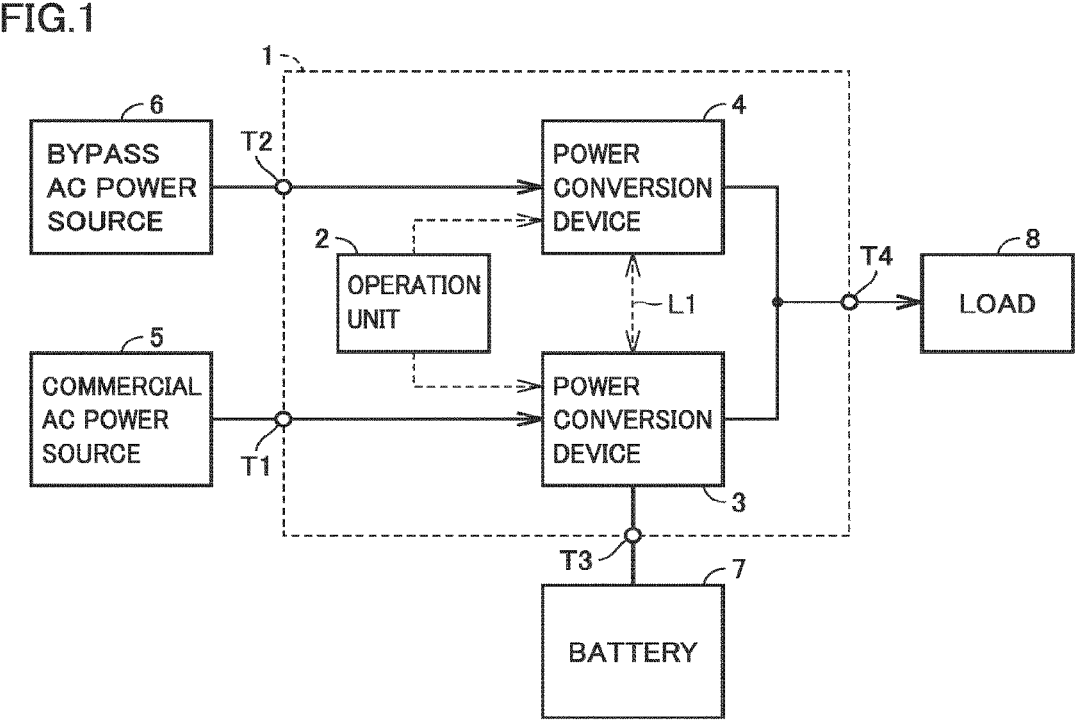
FIG. 1 is a block diagram showing a configuration of an uninterruptible power supply apparatus according to a first embodiment of the present invention.

FIG. 1 is a block diagram showing a configuration of an uninterruptible power supply apparatus 1 according to a first embodiment of the present invention. In FIG. 1, this uninterruptible power supply apparatus 1 includes an AC input terminal T1, a bypass input terminal T2, a battery terminal T3, an AC output terminal T4, an operation unit 2, and power conversion devices 3 and 4.

AC input terminal T1 receives AC power of a commercial frequency from a commercial AC power source 5. Bypass input terminal T2 receives AC power of a commercial frequency from a bypass AC power source 6. Battery terminal T3 is connected to a battery (power storage device) 7. Instead of battery 7, a capacitor may be connected. AC output terminal T4 is connected to a load 8. Load 8 is driven by the AC power.

Bypass AC power source 6 may be the same as or different from commercial AC power source 5. Herein, commercial AC power source 5 is the same as bypass AC power source 6. Output voltages of commercial AC power source 5 and bypass AC power source 6 may vary (increase or decrease) even in a normal state. Load 8 is preferably driven by a rated AC voltage having a sinusoidal waveform with no waveform distortion. However, load 8 can also be driven by an AC voltage having waveform distortion and falling within an acceptable input voltage range of load 8, as long as the AC voltage is within a range acceptable to load 8.

Operation unit 2 includes a plurality of buttons operated by a user of uninterruptible power supply apparatus 1, an image display unit configured to display various types of information, and the like. When the user operates operation unit 2, uninterruptible power supply apparatus 1 can be powered on and off, and any one of a first mode in which power conversion device 3 is commonly used and power conversion device 4 is kept in reserve and a second mode in which power conversion device 4 is commonly used and power conversion device 3 is kept in reserve can be selected.

In the normal state in which the AC power is supplied from commercial AC power source 5, power conversion device 3 converts the AC power to DC power, and stores the DC power in battery 7 and converts the DC power to AC power. In the power failure state in which the supply of the AC power from commercial AC power source 5 is stopped, power conversion device 3 converts the DC power of battery 7 to AC power. Even when the output voltage of commercial AC power source 5 varies, power conversion device 3 uses the DC power of battery 7 to output the rated AC voltage having a sinusoidal waveform with no waveform distortion.

Power conversion device 4 converts the AC power supplied from bypass AC power source 6 to DC power, and converts the DC power to AC power. When the output voltage of bypass AC power source 6 is sufficiently high, power conversion device 4 outputs the AC voltage having a sinusoidal waveform with no waveform distortion and falling within the acceptable input voltage range of load 8. When the output voltage of bypass AC power source 6 decreases, power conversion device 4 outputs the AC voltage having waveform distortion within a range acceptable to load 8 and falling within the acceptable input voltage range of load 8. The efficiency of power conversion device 3 is lower than the efficiency of power conversion device 4.

Power conversion device 3 and power conversion device 4 are connected to each other by a communication line L1, and transmit and receive information via communication line L1. For example, when power conversion device 3 has a malfunction, power conversion device 3 transmits a signal indicating the malfunction to power conversion device 4. When power conversion device 4 has a malfunction, power conversion device 4 transmits a signal indicating the malfunction to power conversion device 3. In other words, power conversion device 3 monitors whether or not power conversion device 4 is normally operating, and power conversion device 4 monitors whether or not power conversion device 3 is normally operating.

Next, the operation of this uninterruptible power supply apparatus 1 will be described. In the case where the first mode is selected using operation unit 2, the AC power is supplied from power conversion device 3 to load 8 when power conversion device 3 is normal, and the AC power is supplied from power conversion device 4 to load 8 when power conversion device 3 has a malfunction. In the power failure state in which the supply of the AC power from commercial AC power source 5 is stopped, power conversion device 3 converts the DC power of battery 7 to AC power and supplies the AC power to load 8.

In the case where the second mode is selected using operation unit 2, the AC power is supplied from power conversion device 4 to load 8 when power conversion device 4 is normal, and the AC power is supplied from power conversion device 3 to load 8 when power conversion device 4 has a malfunction. In the power failure state in which the supply of the AC power from bypass AC power source 6 is stopped, power conversion device 3 converts the DC power of battery 7 to AC power and supplies the AC power to load 8.

Therefore, even when the power failure occurs or when commonly-used power conversion device 3 or 4 has a malfunction, the operation of load 8 can be continued. Even when the output voltages of AC power sources 5 and 6 vary, the operation of load 8 can be continued. Furthermore, even when the output voltage of bypass AC power source 6 decreases, power conversion device 4 causes the AC voltage to have waveform distortion within the range acceptable to load 8, and outputs the AC voltage within the acceptable input voltage range of load 8. Therefore, even when the output voltage of bypass AC power source 6 decreases, the operation of load 8 can be continued.

Figure 2:
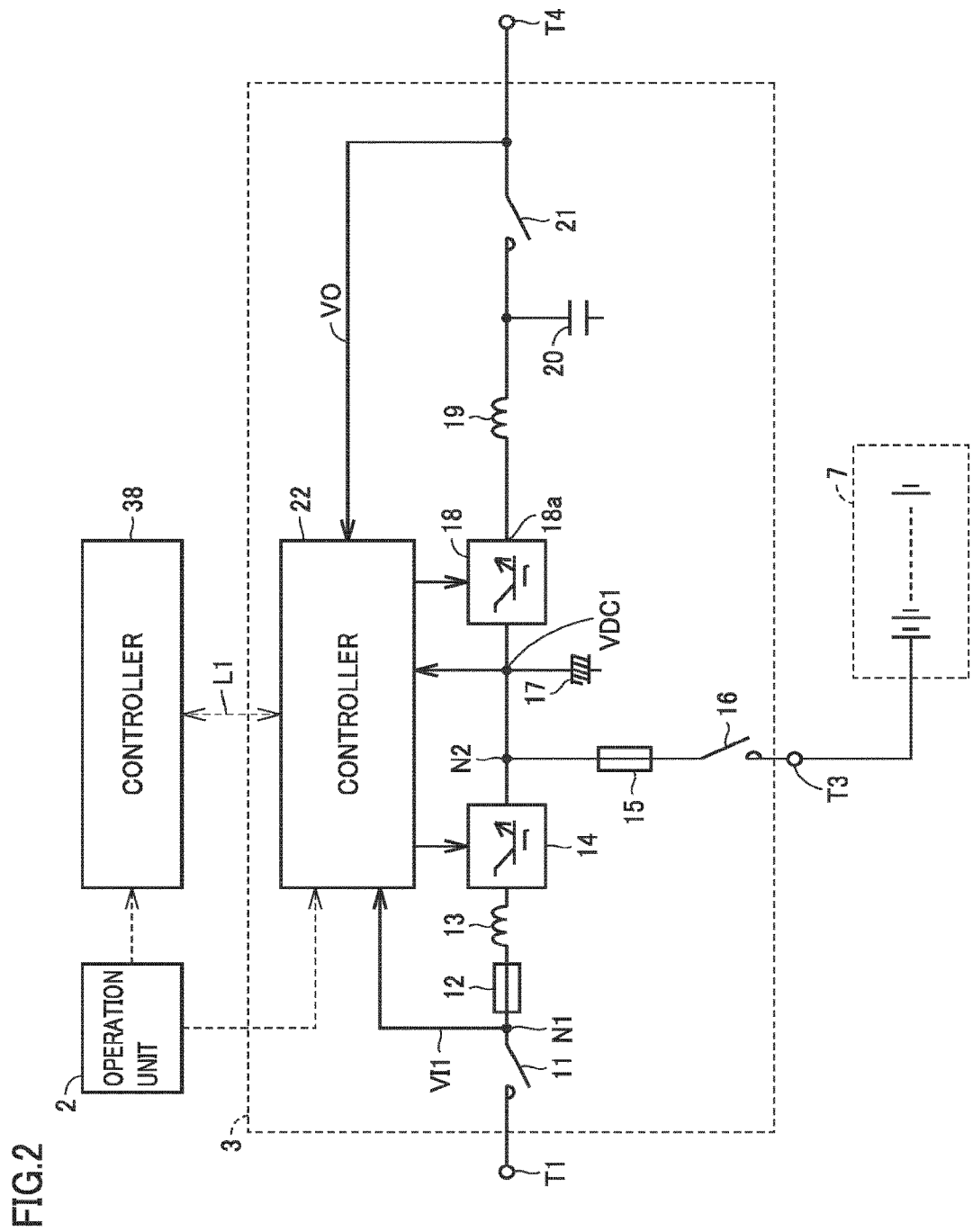
FIG. 2 is a circuit block diagram showing a configuration of a power conversion device 3 shown in FIG. 1.

FIG. 2 is a circuit block diagram showing a configuration of power conversion device 3. Power conversion device 3 temporarily converts the three-phase AC power supplied from commercial AC power source 5 to DC power, and converts the DC power to three-phase AC power and supplies the three-phase AC power to load 8. For simplicity of the figures and description, FIG. 2 shows only a circuit for one phase.

In FIG. 2, this power conversion device 3 includes electromagnetic contactors 11, 16 and 21, fuses 12 and 15, AC reactors 13 and 19, a converter 14, a smoothing electrolytic capacitor 17, an inverter 18, a capacitor 20, and a controller 22.

Electromagnetic contactor 11, fuse 12 and AC reactor 13 are serially connected between AC input terminal T1 and an input node of converter 14. Electromagnetic contactor 11 is controlled by controller 22, and is turned on when using power conversion device 3 and is turned off, for example, at the time of maintenance and inspection of power conversion device 3. When an overcurrent flows, fuse 12 blows to protect commercial AC power source 5, power conversion device 3 and the like. An instantaneous value of an AC input voltage VI1 appearing at a node N1 between electromagnetic contactor 11 and fuse 12 is detected by controller 22. Based on the detected value of AC input voltage VI1, it is determined, for example, whether or not the AC power is being normally supplied from commercial AC power source 5 (i.e., whether or not the power failure occurs).

AC reactor 13 forms a low-pass filter. AC reactor 13 allows the AC power of a commercial frequency to pass through converter 14 from commercial AC power source 5, and prevents a signal of a switching frequency generated at converter 14 from passing through commercial AC power source 5.

Converter 14 is a forward converter and is controlled by controller 22. In the normal state in which the AC power is supplied from commercial AC power source 5, converter 14 converts the AC power to DC power and outputs the DC power to a power source node N2. An output voltage of converter 14 can be controlled to a desired value. In the power failure state in which the supply of the AC power from commercial AC power source 5 is stopped, the operation of converter 14 is stopped.

Power source node N2 is connected to battery terminal T3 with fuse 15 and electromagnetic contactor 16 interposed therebetween. When an overcurrent flows, fuse 15 blows to protect power conversion device 3, battery 7 and the like. Electromagnetic contactor 16 is controlled by controller 22, and is turned on when using power conversion device 3 and is turned off, for example, at the time of maintenance and inspection of power conversion device 3 and battery 7. Smoothing electrolytic capacitor 17 is connected to power source node N2 and smoothes a voltage of power source node N2. An instantaneous value of a DC voltage VDC1 appearing at power source node N2 is detected by controller 22.

Inverter 18 is a reverse converter and is controlled by controller 22. Inverter 18 converts the DC power generated by converter 14 or the DC power of battery 7 to AC power of a commercial frequency, and outputs the AC power to an output node 18a. Namely, inverter 18 converts the DC power supplied from converter 14 through power source node N2 to the AC power in the normal state, and converts the DC power supplied from battery 7 to the AC power in the power failure state. An output voltage of inverter 18 can be controlled to a desired value.

Output node 18a of inverter 18 is connected to one terminal of electromagnetic contactor 21 with AC reactor 19 interposed therebetween, and the other terminal of electromagnetic contactor 21 is connected to AC output terminal T4. Capacitor 20 is connected to one terminal of electromagnetic contactor 21. AC reactor 19 and capacitor 20 form a low-pass filter. AC reactor 19 and capacitor 20 allow the AC power of a commercial frequency generated by inverter 18 to pass through AC output terminal T4, and prevent a signal of a switching frequency generated at inverter 18 from passing through AC output terminal T4.

Electromagnetic contactor 21 is controlled by controller 22, and is turned on when using power conversion device 3 and is turned off, for example, at the time of a malfunction of inverter 18 and at the time of maintenance and inspection of power conversion device 3. An instantaneous value of an AC output voltage VO appearing at AC output terminal T4 is detected by controller 22.

Controller 22 operates based on a signal provided from operation unit 2 and a signal provided from a controller 38 (see FIG. 4) of power conversion device 4 via communication line L1, detects the instantaneous values of AC input voltage VI1, DC voltage VDC1 and AC output voltage VO, and controls the whole of power conversion device 3 based on these detected values. Namely, based on the detected value of AC input voltage VI1, controller 22 detects whether or not the supply of the AC power from commercial AC power source 5 has been stopped. When the AC power is supplied from commercial AC power source 5 in the first mode (or when power conversion device 4 has a malfunction in the second mode), controller 22 controls converter 14 and inverter 18 in synchronization with a phase of AC input voltage VI1.

Controller 22 controls converter 14 such that DC voltage VDC1 becomes a desired target DC voltage VDCT1. Controller 22 controls inverter 18 such that output voltage VO changes to a rated voltage having a sinusoidal waveform with no waveform distortion. Controller 22 controls inverter 18 such that a phase of output voltage VO matches with a phase of input voltage VI1.

When the supply of the AC power from commercial AC power source 5 is stopped in the first mode (or when power conversion device 4 has a malfunction in the second mode), controller 22 stops the operation of converter 14 and continues the operation of inverter 18. When DC voltage VDC1 becomes lower than a discharge end voltage of battery 7, controller 22 stops the operation of inverter 18.

Furthermore, when inverter 18 has a malfunction in the first mode, controller 22 transmits a signal indicating the malfunction to controller 38 of power conversion device 4 via communication line L1. When a signal indicating that an inverter 34 (see FIG. 4) has a malfunction is transmitted from controller 38 via communication line L1 in the second mode, controller 22 drives inverter 18 instantaneously.

Figure 3:
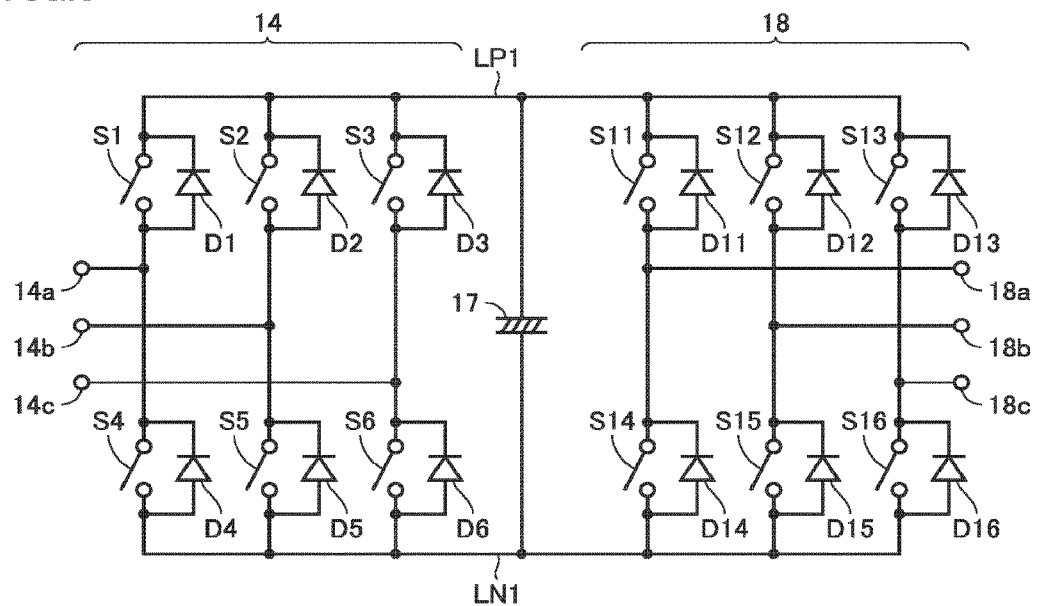
FIG. 3 is a circuit diagram showing a configuration of a converter and an inverter shown in FIG. 2.

FIG. 3 is a circuit diagram showing a configuration of converter 14 and inverter 18. In FIG. 3, converter 14 includes input nodes 14a to 14c, switching elements S1 to S6 and diodes D1 to D6, and inverter 18 includes switching elements S11 to S16, diodes D11 to D16 and output nodes 18a to 18c.

Input nodes 4a to 4c of converter 14 receive the three-phase AC voltage supplied from commercial AC power source 5, respectively. One electrodes of switching elements S1 to S3 are connected to a DC positive bus LP1, and the other electrodes thereof are connected to input nodes 4a to 4c, respectively. One electrodes of switching elements S4 to S6 are connected to input nodes 4a to 4c, respectively, and the other electrodes thereof are connected to a DC negative bus LN1. Diodes D1 to D6 are connected in antiparallel to switching elements S1 to S6, respectively. Smoothing electrolytic capacitor 17 is connected between DC positive bus LP1 and DC negative bus LN1, and smoothes DC voltage VDC1 between buses LP1 and LN1.

One electrodes of switching elements S11 to S13 of inverter 18 are connected to DC positive bus LP1, and the other electrodes thereof are connected to output nodes 18a to 18c, respectively. One electrodes of switching elements S14 to S16 are connected to output nodes 18a to 18c, respectively, and the other electrodes thereof are connected to DC negative bus LN1. Diodes D11 to D16 are connected in antiparallel to switching elements S11 to S16, respectively.

Each of switching elements S1 to S6 and S11 to S16 is controlled by controller 22 and is turned on and off at prescribed timing in synchronization with three-phase AC voltage VI supplied from commercial AC power source 5. Switching elements S1 to S3 are turned on and off in synchronization with three-phase AC voltage VI1, and when switching elements S1 to S3 are turned on/off, switching elements S4 to S6 are turned off/on, respectively. Switching elements S11 to S13 are turned on and off in synchronization with three-phase AC voltage VI1, and when switching elements S11 to S13 are turned on/off, switching elements S14 to S16 are turned off/on, respectively.

By adjusting a phase difference between three-phase AC voltage VI1 supplied from commercial AC power source 5 and the timing of turning on and off switching elements S1 to S6, DC voltage VDC1 can be adjusted to a desired voltage. In addition, by adjusting the time of turning on each of switching elements S11 to S16, output voltage VO can be adjusted to a desired voltage.

When converter 14 and inverter 18 are operated, controller 22 turns on/off each of switching elements S1 to S6 of converter 14 such that DC voltage VDC1 becomes prescribed target voltage VDCT1, and turns on/off each of switching elements S11 to S16 of inverter 18 such that output voltage VO becomes the rated AC voltage having a sinusoidal waveform with no waveform distortion. An amplitude of output voltage VO is set to have a value smaller than VDCT1×½. Furthermore, controller 22 turns on/off each of switching elements S11 to S16 of inverter 18 such that the phase of output voltage VO matches with the phase of input voltage VI1.

Now, the operation of power conversion device 3 is described. First, description is given of a case in which the first mode is selected using operation unit 2 and power conversion device 3 outputs the AC power to load 8. In the normal state in which the AC power is supplied from commercial AC power source 5, electromagnetic contactors 11, 16 and 21 are ON. The AC power supplied from commercial AC power source 5 is converted to DC power by converter 14. The DC power generated by converter 14 is stored in battery 7, and is converted to AC power by inverter 18 and the AC power is supplied to load 8.

Output voltage VO of power conversion device 3 is maintained at the rated AC voltage having a sinusoidal waveform with no waveform distortion. Even when the output voltage of commercial AC power source 5 decreases temporarily, voltage VDC1 of power source node N2 is maintained constant by battery 7 and output voltage VO is maintained at the rated AC voltage having a sinusoidal waveform.

In the power failure state in which the supply of the AC power from commercial AC power source 5 is stopped, the operation of converter 14 is stopped and the DC power of battery 7 is supplied to inverter 18. Inverter 18 converts the DC power supplied from battery 7 to AC power, and supplies the AC power to load 8. Therefore, even when the power failure occurs, the operation of load 8 can be continued during a period in which the DC power is kept in store in battery 7.

When inverter 18 has a malfunction in the normal state, switching elements S11 to S16 of inverter 18 are fixed in the OFF state, and the signal indicating that inverter 18 has a malfunction is transmitted to power conversion device 4 and the AC power is supplied from power conversion device 4 to load 8. Since the phase of the output voltage of power conversion device 4 is synchronized with the phase of output voltage VO of power conversion device 3, an overcurrent never flows when the AC power is supplied from power conversion device 4 to load 8.

When the second mode is selected using operation unit 2, the AC power is supplied from power conversion device 4 to load 8. When power conversion device 4 is normal, converter 14 is operated such that DC voltage VDC1 is maintained at target voltage VDCT, and the operation of inverter 18 is stopped such that switching elements S11 to S16 of inverter 18 are fixed in the OFF state.

At this time, controller 22 internally generates a control signal for controlling switching elements S11 to S16 in synchronization with AC voltage V11, and stands by in a state of being capable of controlling switching elements S11 to S16 immediately when power conversion device 4 has a malfunction. Therefore, when a notification that power conversion device 4 has a malfunction is provided from controller 38 of power conversion device 4, the AC power is instantaneously supplied from power conversion device 3 to load 8.

Figure 4:
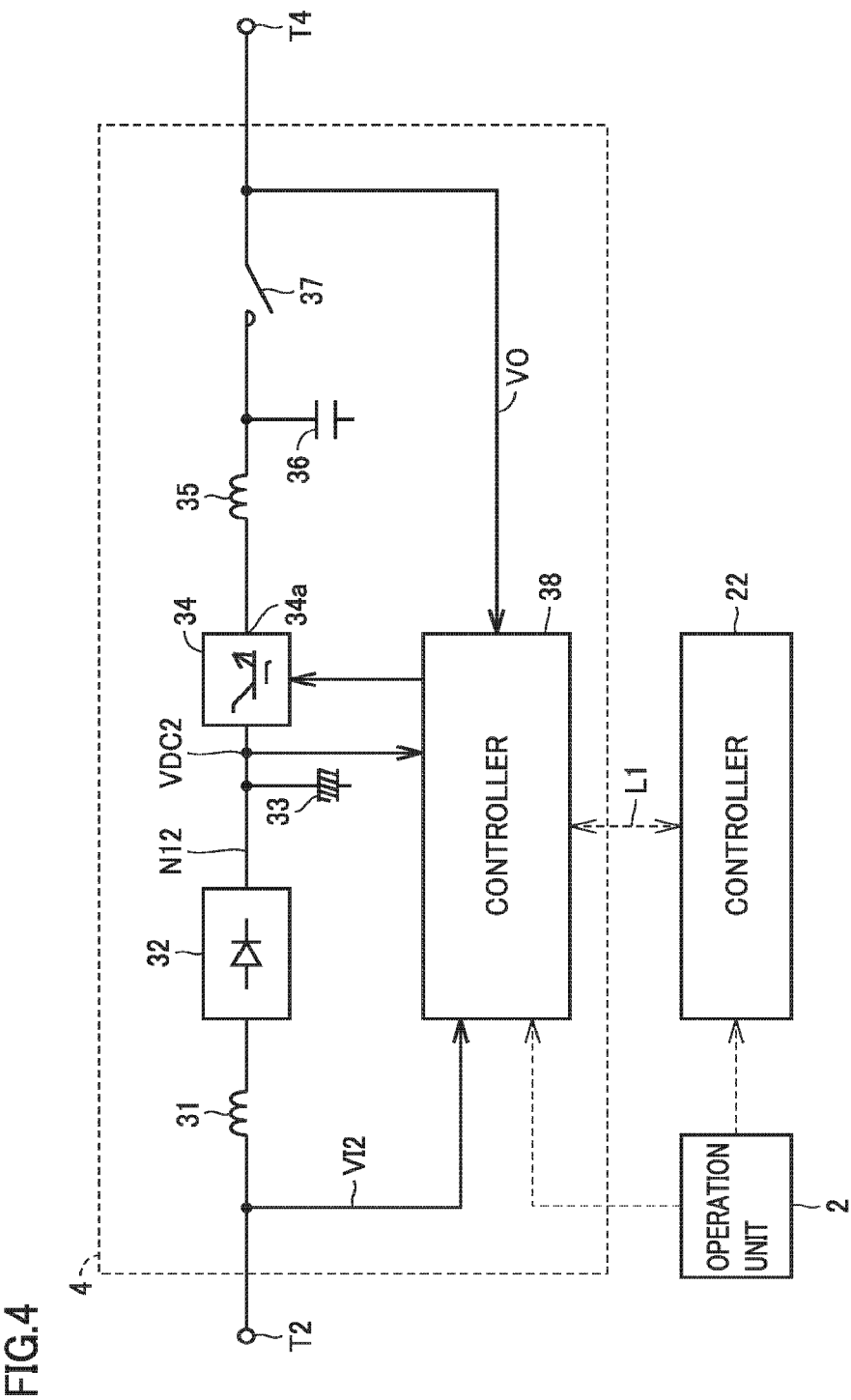
FIG. 4 is a circuit block diagram showing a configuration of a power conversion device 4 shown in FIG. 1.

FIG. 4 is a circuit block diagram showing a configuration of power conversion device 4. Power conversion device 4 temporarily converts the three-phase AC power supplied from bypass AC power source 6 to DC power, and converts the DC power to three-phase AC power. For simplicity of the figures and description, FIG. 4 shows only a circuit for one phase.

In FIG. 4, this power conversion device 4 includes AC reactors 31 and 35, a converter 32, a smoothing electrolytic capacitor 33, inverter 34, a capacitor 36, an electromagnetic contactor 37, and controller 38.

AC reactor 31 is connected between bypass input terminal T2 and an input node of converter 32. AC reactor 31 forms a low-pass filter. AC reactor 31 allows the AC power of a commercial frequency to pass through converter 32 from bypass AC power source 6, and prevents a signal of a switching frequency generated at converter 32 from passing through bypass AC power source 6. An instantaneous value of an AC input voltage VI2 appearing at bypass input terminal T2 is detected by controller 38.

Converter 32 is a rectifier, and converts the AC power to DC power and outputs the DC power to a power source node N12. An output voltage of converter 32 changes in accordance with the output voltage of bypass AC power source 6. Smoothing electrolytic capacitor 33 is connected to power source node N12 and smoothes a voltage of power source node N12. An instantaneous value of a DC voltage VDC2 appearing at power source node N12 is detected by controller 38.

Inverter 34 is a reverse converter and is controlled by controller 38. Inverter 34 converts the DC power generated by converter 32 to AC power of a commercial frequency, and outputs the AC power to an output node 34a. An output voltage of inverter 34 can be controlled to a desired value.

Output node 34a of inverter 34 is connected to one terminal of electromagnetic contactor 37 with AC reactor 35 interposed therebetween, and the other terminal of electromagnetic contactor 37 is connected to AC output terminal T4. Capacitor 36 is connected to one terminal of electromagnetic contactor 37. AC reactor 35 and capacitor 36 form a low-pass filter. AC reactor 35 and capacitor 36 allow the AC power of a commercial frequency generated by inverter 34 to pass through AC output terminal T4, and prevent a signal of a switching frequency generated at inverter 34 from passing through AC output terminal T4.

Electromagnetic contactor 37 is turned on when using power conversion device 4 and is turned off, for example, at the time of a malfunction of inverter 34 and at the time of maintenance and inspection of power conversion device 4. An instantaneous value of AC output voltage VO appearing at AC output terminal T4 is detected by controller 38.

Controller 38 operates based on a signal provided from operation unit 2 and a signal provided from a controller 22 of power conversion device 3 via communication line L1, detects the instantaneous values of AC input voltage VI2, DC voltage VDC2 and AC output voltage VO, and controls the whole of power conversion device 4 based on these detected values.

Namely, based on the detected value of AC input voltage VI2, controller 38 detects whether or not the supply of the AC power from bypass AC power source 6 has been stopped. When the AC power is supplied from bypass AC power source 6 in the second mode (or when power conversion device 3 has a malfunction in the first mode), controller 38 controls inverter 34 in synchronization with a phase of AC input voltage VI2. At this time, controller 38 controls inverter 34 such that the phase of output voltage VO matches with the phase of input voltage VI2. Herein, commercial AC power source 5 is the same as bypass AC power source 6, and thus, the phase of output voltage VO of power conversion device 4 matches with the phase of output voltage VO of power conversion device 3.

When DC voltage VDC2 of power source node N12 is higher than a predetermined lower limit voltage VL, controller 38 controls inverter 34 such that AC voltage VO having a sinusoidal waveform with no waveform distortion and falling within the acceptable input voltage range of load 8 is output. When DC voltage VDC2 of power source node N12 is lower than predetermined lower limit voltage VL, controller 38 controls inverter 34 such that AC voltage VO having waveform distortion within a range acceptable to load 8 and falling within the acceptable input voltage range of load 8 is output. Lower limit voltage VL is a minimum DC voltage required for power conversion device 4 to output lower limit AC voltage VO within the acceptable input voltage range of load 8.

Furthermore, when the supply of the AC power from bypass AC power source 6 is stopped in the second mode, controller 38 transmits a signal indicating the stop to controller 22 of power conversion device 3 via communication line L1. When inverter 34 has a malfunction in the second mode, controller 38 transmits a signal indicating the malfunction to controller 22 of power conversion device 3 via communication line L1. When a signal indicating that inverter 18 has a malfunction is transmitted from controller 22 via communication line L1 in the first mode, controller 22 drives inverter 34 instantaneously.

Figure 5:
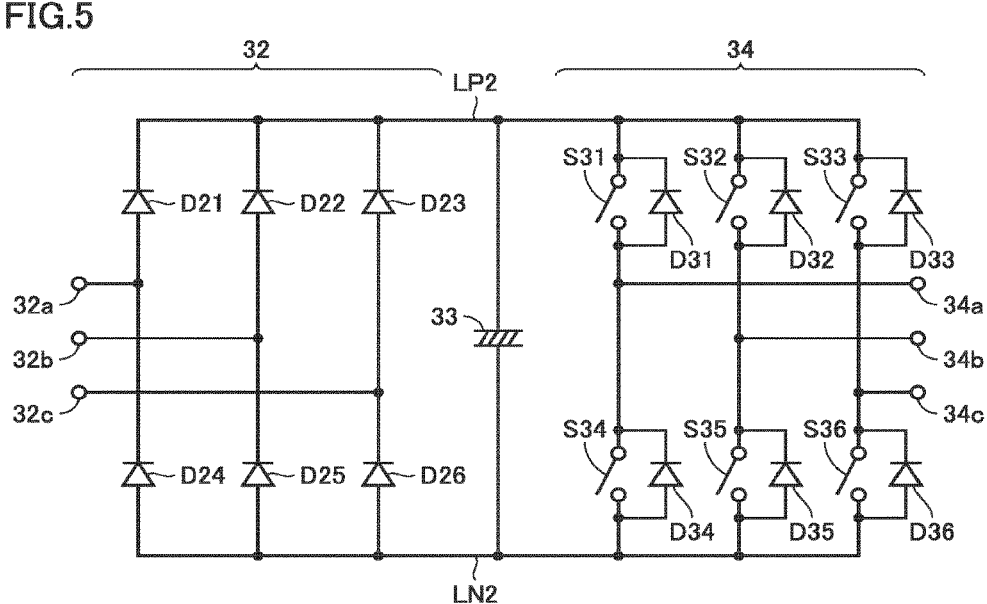
FIG. 5 is a circuit diagram showing a configuration of a converter and an inverter shown in FIG. 4.

FIG. 5 is a circuit diagram showing a configuration of converter 32 and inverter 34. In FIG. 5, converter 32 includes input nodes 32a to 32c and diodes D21 to D26, and inverter 34 includes switching elements S31 to S36, diodes D31 to D36 and output nodes 34a to 34c.

Input nodes 32a to 32c of converter 32 receive the three-phase AC voltage supplied from bypass AC power source 6, respectively. Anodes of diodes D21 to D23 are connected to input nodes 32a to 32c, respectively, and cathodes thereof are connected to a DC positive bus LP2. Anodes of diodes D24 to D26 are connected to a DC negative bus LN2, and cathodes thereof are connected to input nodes 32a to 32c, respectively. The three-phase AC voltage supplied from bypass AC power source 6 is subjected to full-wave rectification by diodes D21 to D26 and is converted to DC voltage VDC2. Smoothing electrolytic capacitor 33 is connected between DC positive bus LP2 and DC negative bus LN2, and smoothes DC voltage VDC2 between buses LP2 and LN2.

One electrodes of switching elements S31 to S33 of inverter 34 are connected to DC positive bus LP2, and the other electrodes thereof are connected to output nodes 34a to 34c, respectively. One electrodes of switching elements S34 to S36 are connected to output nodes 34a to 34c, respectively, and the other electrodes thereof are connected to DC negative bus LN2. Diodes D31 to D36 are connected in antiparallel to switching elements S31 to S36, respectively.

Each of switching elements S31 to S36 is controlled by controller 38 and is turned on and off at prescribed timing in synchronization with three-phase AC voltage VI2 supplied from bypass AC power source 6. Switching elements S31 to S33 are turned on and off in synchronization with three-phase AC voltage VI2, and when switching elements S31 to S33 are turned on/off, switching elements S34 to S36 are turned off/on, respectively. By adjusting the time of turning on each of switching elements S31 to S36, output voltage VO can be adjusted to a desired voltage.

When inverter 34 is operated, controller 38 turns on/off each of switching elements S31 to S36 such that the phase of output voltage VO matches with the phase of input voltage VI2. When DC voltage VDC2 of power source node N12 is higher than lower limit voltage VL, controller 38 turns on/off each of switching elements S31 to S36 such that AC voltage VO having a sinusoidal waveform with no waveform distortion and falling within the acceptable input voltage range of load 8 is output.

Furthermore, when DC voltage VDC2 of power source node N12 is lower than lower limit voltage VL, controller 38 turns on/off each of switching elements S31 to S36 such that AC voltage VO having waveform distortion within a range acceptable to load 8 and falling within the acceptable input voltage range of load 8 is output.

Figure 6:
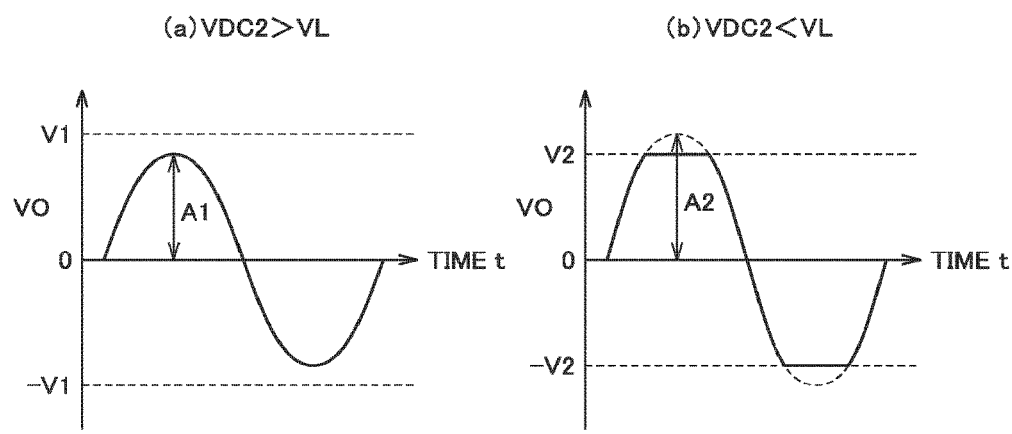
FIG. 6 is a time chart showing the operation of power conversion device 4 shown in FIG. 4.

FIGS. 6(a) and 6(b) are time charts showing a waveform of output voltage VO of power conversion device 4. FIG. 6(a) shows a waveform of output voltage VO when DC voltage VDC2 is higher than lower limit voltage VL, and FIG. 6(b) shows a waveform of output voltage VO when DC voltage VDC2 is lower than lower limit voltage VL.

As shown in FIG. 6(a), when VDC2>VL, DC voltage VDC2 is a voltage 2×V1 corresponding to input voltage VI2. Controller 38 controls inverter 34 such that inverter 34 outputs sinusoidal AC voltage VO having an amplitude of a prescribed value A1 smaller than V1. Output voltage VO is maintained at a voltage within the acceptable input voltage range of load 8. In this case, DC voltage V1 is greater than amplitude A1 of AC voltage VO, and thus, output voltage VO has a sinusoidal waveform with no distortion.

As shown in FIG. 6(b), when VDC2<VL, DC voltage VDC2 is a voltage 2×V2 corresponding to input voltage VI2. V2 is smaller than V1 (V2<V1). In this case, if controller 38 controls inverter 34 such that inverter 34 outputs sinusoidal AC voltage VO having an amplitude of a prescribed value smaller than V2, output voltage VO falls below the lower limit value of the acceptable input voltage range of load 8.

Thus, controller 38 controls inverter 34 such that inverter 34 outputs sinusoidal AC voltage VO having an amplitude of a prescribed value A2 greater than V2. In this case, DC voltage V2 is smaller than amplitude A2 of AC voltage VO, and thus, output voltage VO is limited within the range of −V2 to +V2 and output voltage VO has a trapezoidal waveform, not a sinusoidal waveform. Assuming that the amplitude is the same, a voltage value (effective value) of the AC voltage having a trapezoidal waveform is greater than a voltage value of the AC voltage having a sinusoidal waveform. Therefore, output voltage VO can be maintained at the voltage within the acceptable input voltage range of load 8.

Figure 7:
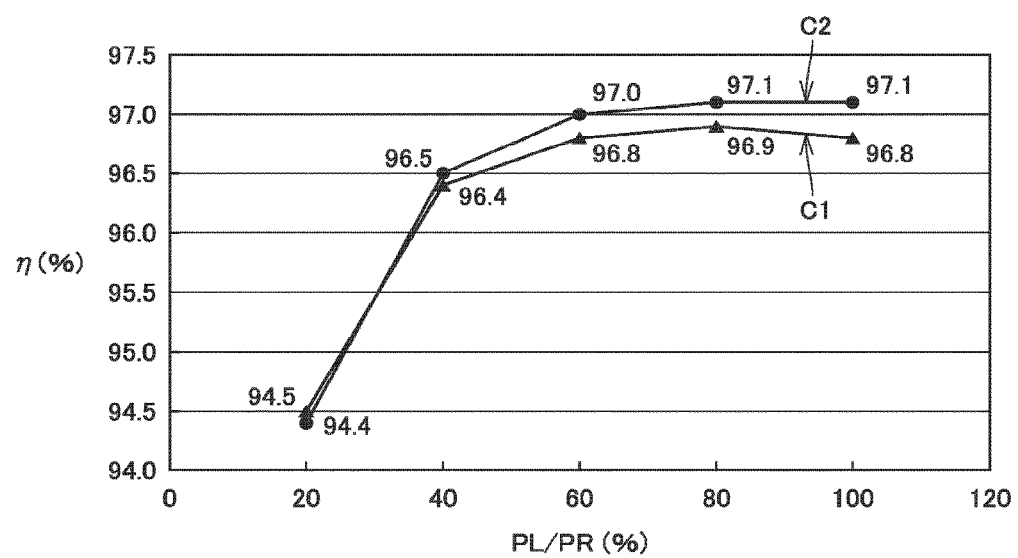
FIG. 7 is a diagram for comparing the efficiency of power conversion device 3 and the efficiency of power conversion device 4 shown in FIG. 1.

FIG. 7 is a diagram for comparing efficiency η (%) of power conversion device 3 and efficiency η (%) of power conversion device 4. The horizontal axis in FIG. 7 represents a percentage PL/PR (%) of a load capacity PL with respect to a rated capacity PR of each of power conversion devices 3 and 4, and the vertical axis in FIG. 7 represents efficiency η (%) of power conversion devices 3 and 4. Efficiency η corresponds to a percentage PO/PI (%) of AC power PO supplied to load 8 with respect to AC power PI supplied from AC power sources 5 and 6. Curves C1 and C2 represent efficiency η of power conversion devices 3 and 4, respectively. In power conversion device 3, when PL/PR was set at 20%, 40%, 60%, 80%, and 100%, efficiency exhibited 94.5%, 96.4%, 96.8%, 96.9%, and 96.8%, respectively.

In contrast, in power conversion device 4, when PL/PR was set at 20%, 40%, 60%, 80%, and 100%, efficiency η exhibited 94.4%, 96.5%, 97.0%, 97.1%, and 97.1%, respectively. That is to say, in the normal range of use in which PL/PR is 40 to 100%, efficiency η of power conversion device 4 was higher than efficiency η of power conversion device 3. This is because a switching loss and a conduction loss occur in switching elements S1 to S6 of converter 14 in power conversion device 3, whereas no switching element is included in converter 32 in power conversion device 4.

Next, the operation of the uninterruptible power supply apparatus shown in FIGS. 1 to 7 will be described. In an initial state, power conversion devices 3 and 4 are normal and the AC power is supplied from each of commercial AC power source 5 and bypass AC power source 6. First, description is given of a case in which the user operates operation unit 2 to select the first mode.

In this case, in power conversion device 3, the AC power supplied from commercial AC power source 5 is converted to DC power, and the DC power is stored in battery 7, and is converted to AC power and the AC power is supplied to load 8. Output voltage VO of power conversion device 3 becomes an AC voltage having a sinusoidal waveform with no waveform distortion and is maintained at a constant rated voltage.

Even when output voltage VI1 of commercial AC power source 5 decreases temporarily, DC voltage VDC1 of power source node N2 is maintained constant by battery 7, and thus, output voltage VO of power conversion device 3 is maintained at a constant rated voltage. Load 8 is driven by the AC power supplied from power conversion device 3.

When the supply of the AC power from commercial AC power source 5 is stopped, i.e., when a power failure occurs, while load 8 is being driven by power conversion device 3, the operation of converter 14 is stopped, and the DC power of battery 7 is converted to AC power by inverter 18 and the AC power is supplied to load 8 in power conversion device 3. Therefore, even when the power failure occurs, the operation of load 8 can be continued during a period in which the DC power is kept in store in battery 7.

When inverter 18 has a malfunction while load 8 is being driven by power conversion device 3, inverter 34 of power conversion device 4 operates instantaneously and the AC power generated at power conversion device 4 is supplied to load 8 and the operation of load 8 is continued. Furthermore, electromagnetic contactor 21 is turned off to electrically separate inverter 18 from AC output terminal T4.

In power conversion device 4, the AC power supplied from bypass AC power source 6 is converted to DC power, and the DC power is converted to AC power and the AC power is supplied to load 8. When output voltage VI2 of bypass AC power source 6 is sufficiently high, VDC2>VL is achieved, and output voltage VO of power conversion device 4 becomes an AC voltage having a sinusoidal waveform with no waveform distortion and is maintained at a voltage within the acceptable input voltage range of load 8.

When output voltage VI2 of bypass AC power source 6 decreases and VDC2<VL is achieved, output voltage VO of power conversion device 4 becomes an AC voltage having waveform distortion within a range acceptable to load 8 and is maintained at a voltage within the acceptable input voltage range of load 8.

Next, description will be given of a case in which the user operates operation unit 2 to select the second mode. In this case, in power conversion device 4, the AC power supplied from bypass AC power source 6 is converted to DC power, and the DC power is converted to AC power and the AC power is supplied to load 8. When output voltage VI2 of bypass AC power source 6 is sufficiently high, VDC2>VL is achieved and AC voltage VO having a sinusoidal waveform with no waveform distortion and falling within the acceptable input voltage range of load 8 is supplied to load 8. When output voltage VI2 of bypass AC power source 6 decreases and VDC2<VL is achieved, AC voltage VO having waveform distortion within a range acceptable to load 8 and falling within the acceptable input voltage range of load 8 is supplied to load 8.

When the supply of the AC power from bypass AC power source 6 is stopped, i.e., when a power failure occurs, while load 8 is being driven by power conversion device 4, the operation of converter 14 is stopped, and the DC power of battery 7 is converted to AC power by inverter 18 and the AC power is supplied to load 8 in power conversion device 3. Therefore, even when the power failure occurs, the operation of load 8 can be continued during a period in which the DC power is kept in store in battery 7. Output voltage VO of power conversion device 3 becomes an AC voltage having a sinusoidal waveform with no waveform distortion and is maintained at a constant rated voltage.

When inverter 34 has a malfunction while load 8 is being driven by power conversion device 4, inverter 18 of power conversion device 3 operates instantaneously and the AC power generated at power conversion device 3 is supplied to load 8 and the operation of load 8 is continued. Furthermore, electromagnetic contactor 37 is turned off to electrically separate inverter 34 from AC output terminal T4. Output voltage VO of power conversion device 3 becomes an AC voltage having a sinusoidal waveform with no waveform distortion and is maintained at a constant rated voltage.

Even when output voltage VI1 of commercial AC power source 5 decreases temporarily, DC voltage VDC1 of power source node N2 is maintained constant by battery 7 and output voltage VO of power conversion device 3 is maintained at a constant rated voltage. Load 8 is driven by the AC power supplied from power conversion device 3.

When the supply of the AC power from commercial AC power source 5 is stopped, i.e., when a power failure occurs, while load 8 is being driven by power conversion device 3, the operation of converter 14 is stopped, and the DC power of battery 7 is converted to AC power by inverter 18 and the AC power is supplied to load 8 in power conversion device 3. Therefore, even when the power failure occurs, the operation of load 8 can be continued during a period in which the DC power is kept in store in battery 7.

As described above, in this first embodiment, power conversion device 3 configured to convert the output voltage of commercial AC power source 5 to a rated voltage having a sinusoidal waveform, and power conversion device 4 configured to convert the output voltage of bypass AC power source 6 to a voltage falling within the acceptable input voltage range of load 8 are provided, and the AC power is supplied from any one of power conversion devices 3 and 4 to load 8, and when this power conversion device has a malfunction, the AC power is supplied from the other power conversion device to load 8. Therefore, even when the output voltages of AC power sources 5 and 6 vary and any one of power conversion devices 3 and 4 has a malfunction, the operation of load 8 can be continued.

Furthermore, even when DC voltage VDC2 generated at converter 32 falls below lower limit voltage VL, power conversion device 4 causes the AC voltage to have waveform distortion within a range acceptable to load 8 and outputs AC voltage VO falling within the acceptable input voltage range of load 8. Therefore, even when the output voltage of bypass AC power source 6 decreases, the operation of load 8 can be continued.

Furthermore, of the first mode in which power conversion device 3 is commonly used and power conversion device 4 is used when power conversion device 3 has a malfunction, and the second mode in which power conversion device 4 is commonly used and power conversion device 3 is used when power conversion device 4 has a malfunction, the selected mode is executed. Therefore, the quality of the AC power supplied to load 8 can be changed in accordance with the specifications of load 8.

Furthermore, the rectifier including six diodes D21 to D26 is used as converter 32, and thus, the power loss in converter 32 can be suppressed.

When DC voltage VDC2 falls below lower limit voltage VL, the switching frequency for turning on and off switching elements S31 to S36 of inverter 34 may be further reduced to cause output voltage VO of power conversion device 4 to have waveform distortion. In this case, the number of times of turning on and off switching elements S31 to S36 of inverter 34 is reduced, and thus, the switching loss in switching elements S31 to S36 can be reduced and efficiency η of power conversion device 4 can be further increased.

Although power conversion device 3 constantly outputs rated AC voltage VO having a sinusoidal waveform with no waveform distortion in this first embodiment, the present invention is not limited thereto. Similarly to power conversion device 4, when DC voltage VDC1 of power source node N2 falls below lower limit voltage VL, power conversion device 3 may output AC voltage VO having waveform distortion within a range acceptable to load 8 and falling within the acceptable input voltage range of load 8. In this case, the operation time of load 8 at the time of a power failure can be lengthened.

Furthermore, similarly to power conversion device 4, even when DC voltage VDC1 of power source node N2 is higher than lower limit voltage VL, power conversion device 3 may output AC voltage VO having a sinusoidal waveform and falling within the acceptable input voltage range of load 8. In this case, by reducing DC voltage VDC1, the conduction loss and the switching loss in switching elements S1 to S6 and S11 to S16 can be reduced.

In this first embodiment, description has been given of the case in which the phase of the output voltage of commercial AC power source 5 is the same as the phase of the output voltage of bypass AC power source 6. However, the present invention is also applicable to a case in which the phase of the output voltage of commercial AC power source 5 is different from the phase of the output voltage of bypass AC power source 6. In such a case, controller 38 of power conversion device 4 needs to control switching elements S31 to S36 of inverter 34 in synchronization with the phase of the output voltage of commercial AC power source 5, or controller 22 of power conversion device 3 needs to control switching elements S11 to S16 of inverter 18 in synchronization with the phase of the output voltage of bypass AC power source 6. As a result, even when the phases of the output voltages of AC power sources 5 and 6 do not match with each other, the phases of the output voltages of power conversion devices 3 and 4 can match with each other, and an overcurrent never flows even when the inverter of one of power conversion devices 3 and 4 has a malfunction and the inverter of the other power conversion device is operated.

Second Embodiment

Figure 8:
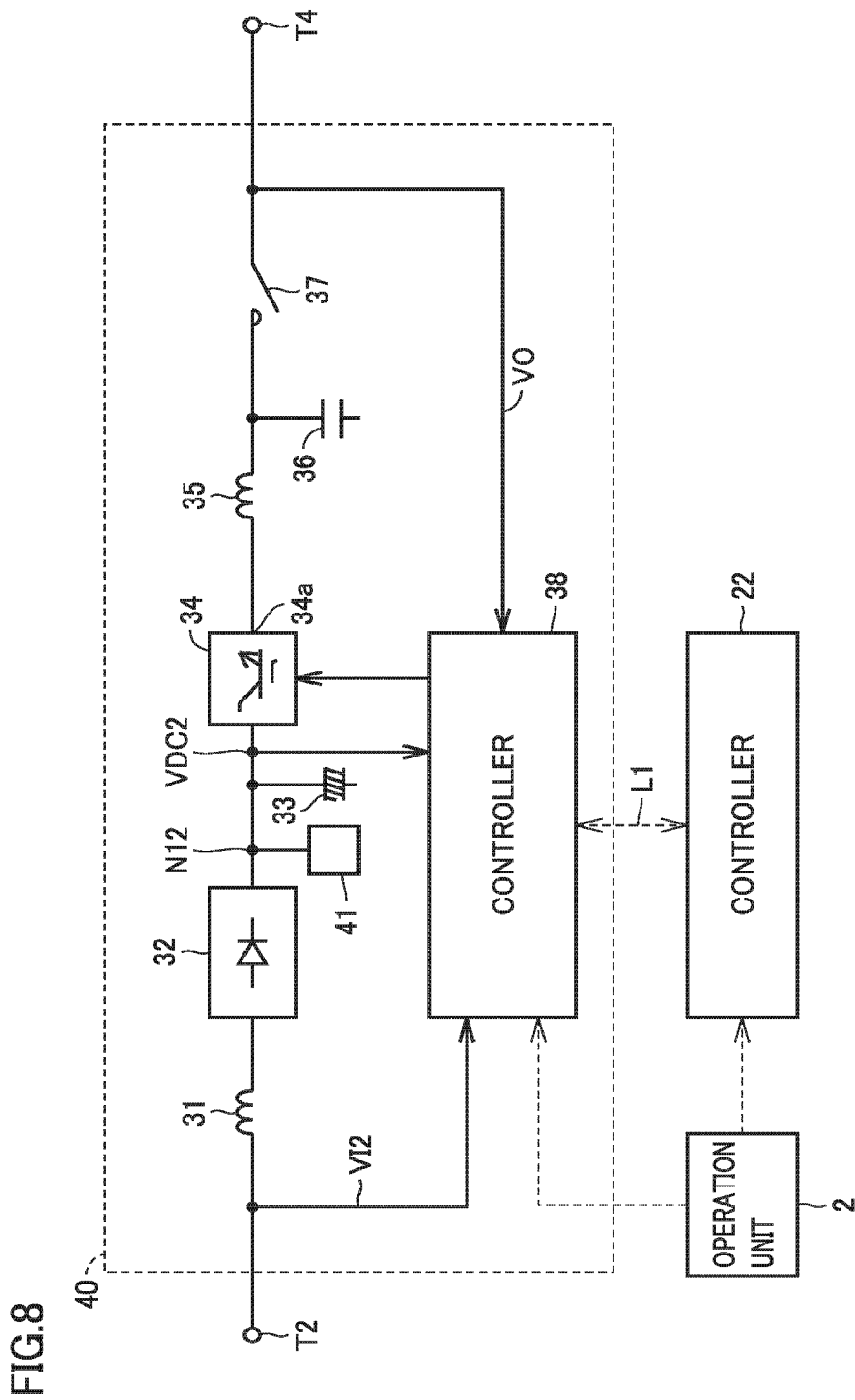
FIG. 8 is a block diagram showing a configuration of a power conversion device included in an uninterruptible power supply apparatus according to a second embodiment of the present invention.

FIG. 8 is a circuit block diagram showing a configuration of a power conversion device 40 included in an uninterruptible power supply apparatus according to a second embodiment of the present invention, and is a diagram compared with FIG. 4. Referring to FIG. 8, a difference between this power conversion device 40 and power conversion device 4 in FIG. 4 is that an electric double layer capacitor 41 is connected to power source node N12.

In this power conversion device 40, in the normal mode in which the AC power is supplied from bypass AC power source 6, the AC power supplied from bypass AC power source 6 is converted to DC power by converter 32 and the DC power is stored in electric double layer capacitor 41 and supplied to inverter 34. In an instantaneous stop mode in which the supply of the AC power from bypass AC power source 6 is temporarily stopped, the DC power of electric double layer capacitor 41 is supplied to inverter 34. Since the remaining configuration and operation are the same as those of the first embodiment, description thereof will not be repeated.

In this second embodiment, the same effect as that of the first embodiment can be obtained, and even when the supply of the AC power from bypass AC power source 6 is temporarily stopped while load 8 is being driven by the AC power generated at power conversion device 40, the operation of load 8 can be continued during a period in which the DC power is kept in store in electric double layer capacitor 41.

The DC power stored in electric double layer capacitor 41 is smaller than the DC power stored in battery 7. Therefore, in the second embodiment, the operation of load 8 can be continued at the time of an instantaneous or short-time (e.g., for several seconds) power failure of bypass AC power source 6, whereas the operation of load 8 cannot be continued at the time of a long-time power failure.

Third Embodiment

Figure 9:
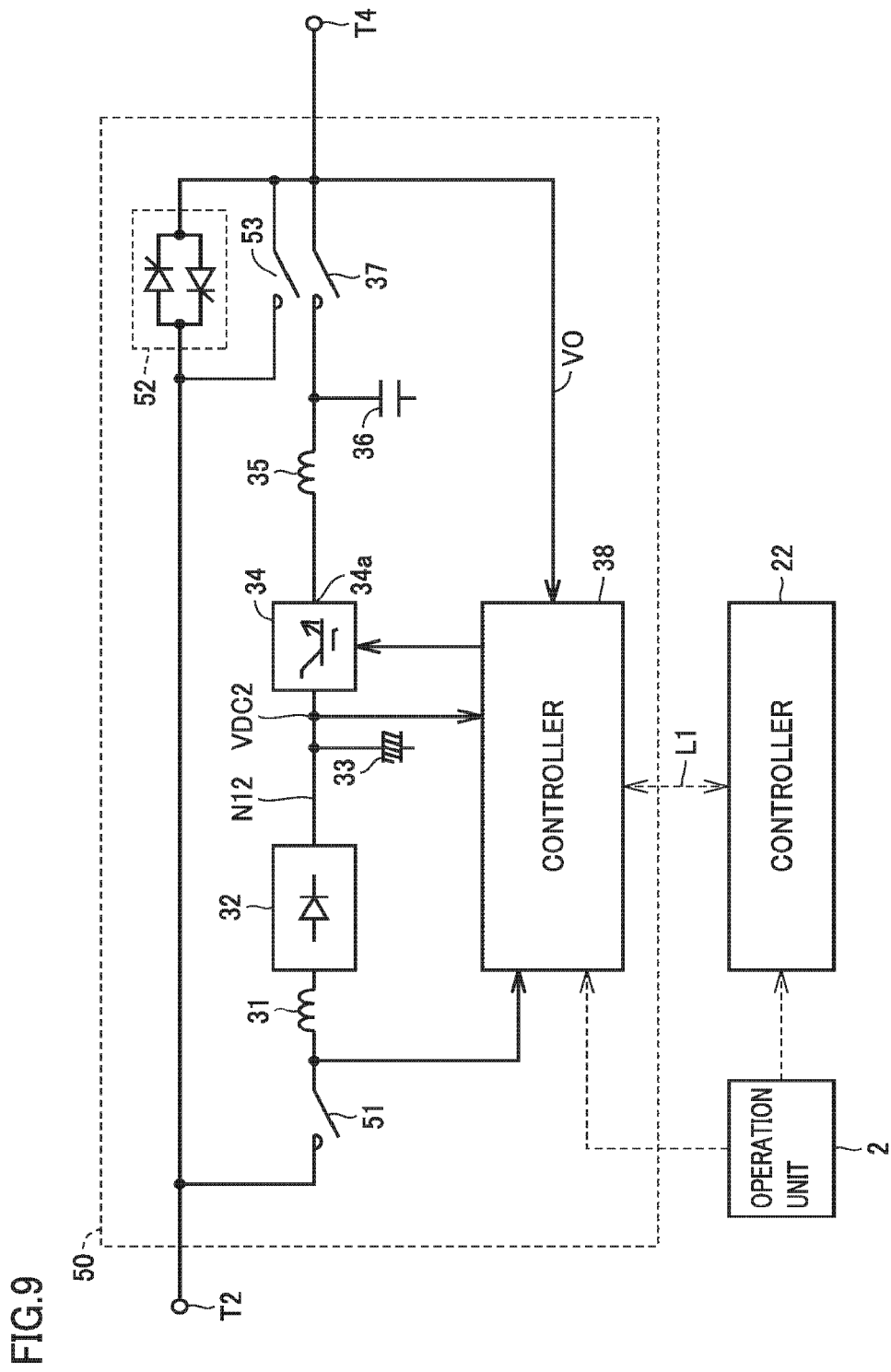
FIG. 9 is a block diagram showing a configuration of a power conversion device included in an uninterruptible power supply apparatus according to a third embodiment of the present invention.

FIG. 9 is a circuit block diagram showing a configuration of a power conversion device 50 included in an uninterruptible power supply apparatus according to a third embodiment of the present invention, and is a diagram compared with FIG. 4. Referring to FIG. 9, a difference between this power conversion device 50 and power conversion device 4 in FIG. 4 is that electromagnetic contactors 51 and 53 and semiconductor switch 52 are added.

One terminal of electromagnetic contactor 51 is connected to bypass input terminal T2, and the other terminal thereof is connected to an input node of converter 32 with AC reactor 31 interposed therebetween. Electromagnetic contactor 51 is controlled by controller 38, and is turned on when using power conversion device 50 and is turned off, for example, at the time of maintenance and inspection of power conversion device 50.

Semiconductor switch 52 is connected between bypass input terminal T2 and AC output terminal T4. Semiconductor switch 52 includes a thyristor and is controlled by controller 38. Semiconductor switch 52 is normally OFF, and when inverter 34 has a malfunction in the second mode, semiconductor switch 52 is instantaneously turned on and allows the AC power supplied from bypass AC power source 6 to pass through AC output terminal T4. Semiconductor switch 52 is turned off after a prescribed time period elapses since semiconductor switch 52 was turned on.

Electromagnetic contactor 53 is connected in parallel to semiconductor switch 52 and is controlled by controller 38. Electromagnetic contactor 53 is turned off in an inverter power feeding mode in which the AC power generated by inverter 34 is fed to AC output terminal T4, and is turned on in a bypass power feeding mode in which the AC power supplied from bypass AC power source 6 is fed to AC output terminal T4. Electromagnetic contactor 37 is turned on in the inverter power feeding mode, and is turned off in the bypass power feeding mode.

In addition, when inverter 34 has a malfunction in the second mode, electromagnetic contactor 53 is turned on and provides the AC power supplied from bypass AC power source 6 to AC output terminal T4. When inverter 34 has a malfunction, electromagnetic contactor 37 is turned off. Namely, when inverter 34 has a malfunction, semiconductor switch 52 is instantaneously turned on for a prescribed time period and electromagnetic contactor 53 is turned on and electromagnetic contactor 37 is turned off. This is done in order to prevent semiconductor switch 52 from being overheated and broken. By operating operation unit 2, one of the inverter power feeding mode and the bypass power feeding mode can also be selected manually. Since the remaining configuration and operation are the same as those of the first embodiment, description thereof will not be repeated.

In this third embodiment, the same effect as that of the first embodiment can be obtained, and even when inverter 34 further has a malfunction while inverter 34 of power conversion device 4 is supplying the AC power to load 8 after inverter 18 of power conversion device 3 has a malfunction in the second mode, the AC power can be supplied from bypass AC power source 6 to load 8 and the operation of load 8 can be continued.

Fourth Embodiment

Figure 10:
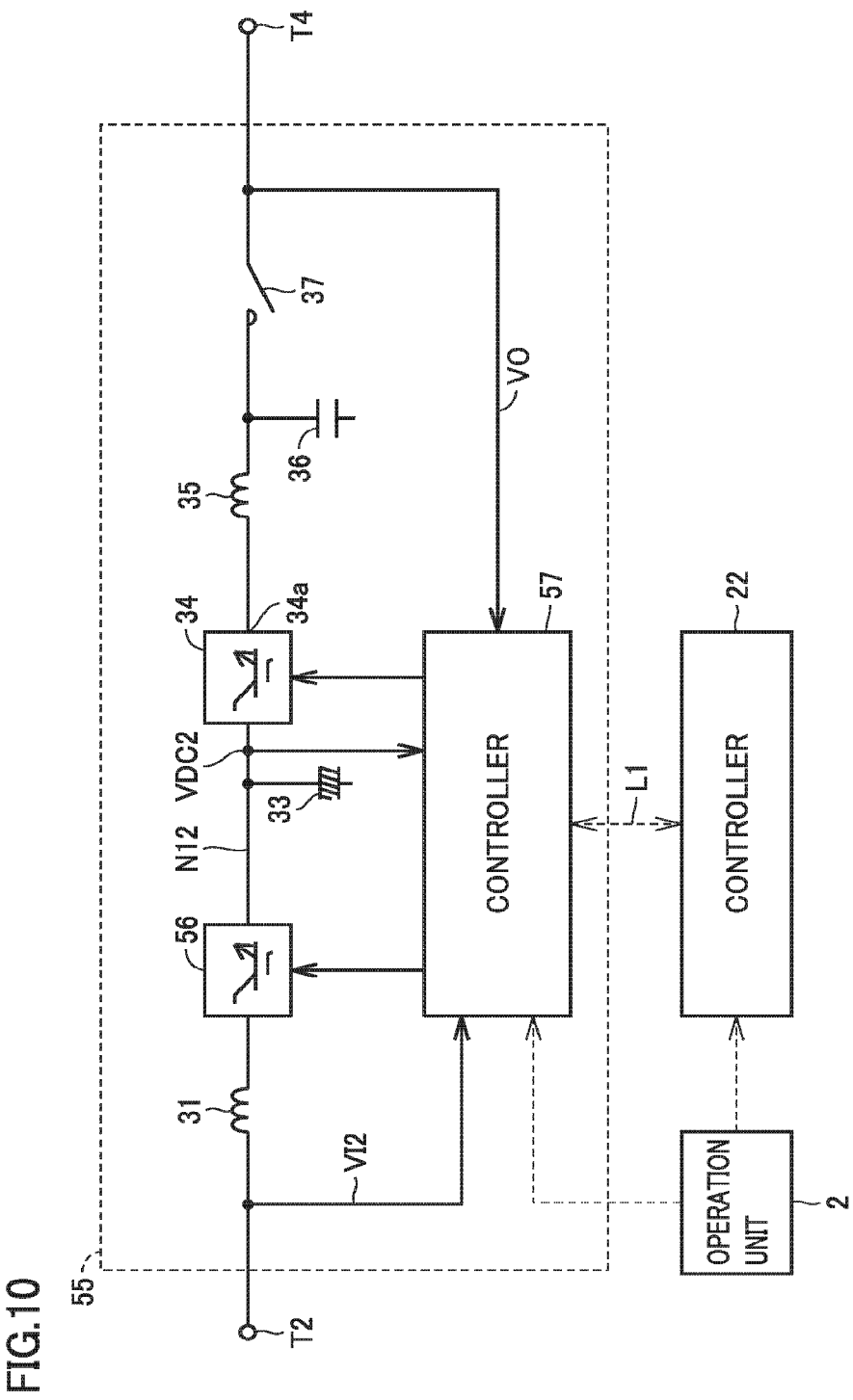
FIG. 10 is a block diagram showing a configuration of a power conversion device included in an uninterruptible power supply apparatus according to a fourth embodiment of the present invention.

FIG. 10 is a circuit block diagram showing a configuration of a power conversion device 55 included in an uninterruptible power supply apparatus according to a fourth embodiment of the present invention, and is a diagram compared with FIG. 4. Referring to FIG. 10, a difference between this power conversion device 55 and power conversion device 4 in FIG. 4 is that converter 32 and controller 38 are replaced with a converter 56 and a controller 57, respectively.

Controller 57 controls converter 56 in synchronization with input voltage VI2 (output voltage of bypass AC power source 6). Converter 56 is controlled by controller 57, and converts the AC power supplied from bypass AC power source 6 to DC power and outputs the DC power to power source node N12. Converter 56 outputs DC voltage VDC2 having an amplitude corresponding to an amplitude of input voltage VI2.

Figure 11:
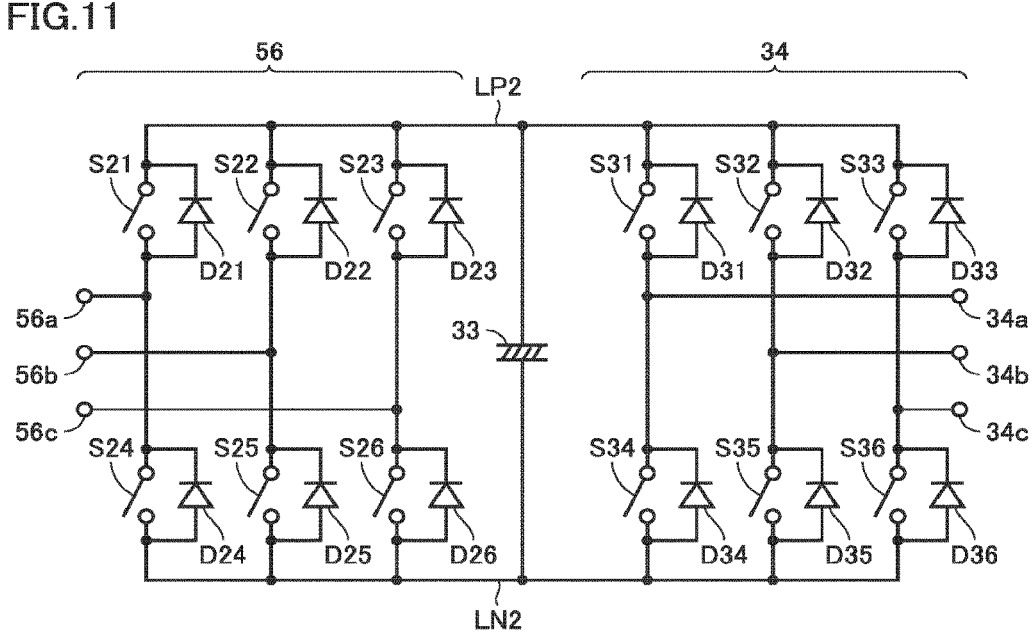
FIG. 11 is a circuit diagram showing a configuration of a converter and an inverter shown in FIG. 10.

FIG. 11 is a circuit diagram showing a configuration of converter 56 and inverter 34, and is a diagram compared with FIG. 5. The configuration of inverter 34 is as shown in FIG. 5. Converter 56 includes input nodes 56a to 56c, switching elements S21 to S26 and diodes D21 to D26.

Input nodes 56a to 56c of converter 56 receive the three-phase AC voltage from bypass AC power source 6, respectively. One electrodes of switching elements S21 to S23 are connected to DC positive bus LP2, and the other electrodes thereof are connected to input nodes 37a to 37c, respectively. One electrodes of switching elements S24 to S26 are connected to input nodes 37a to 37c, respectively, and the other electrodes thereof are connected to DC negative bus LN2. Diodes D21 to D26 are connected in antiparallel to switching elements S21 to S26, respectively. Smoothing electrolytic capacitor 33 is connected between DC positive bus LP2 and DC negative bus LN2, and smoothes DC voltage VDC2 between buses LP2 and LN2.

Each of switching elements S21 to S26 is controlled by controller 57 and is turned on and off at prescribed timing in synchronization with three-phase AC voltage VI2 supplied from bypass AC power source 6. Switching elements S21 to S23 are turned on and off in synchronization with three-phase AC voltage VI2, and when switching elements S21 to S23 are turned on/off, switching elements S24 to S26 are turned off/on, respectively. As a result, DC voltage VDC2 having an amplitude corresponding to an amplitude of AC voltage VI2 is generated.

This output voltage VDC2 of converter 56 is higher than output voltage VDC2 of converter 32 in FIG. 5 by two times of the forward drop voltage of diode D. Therefore, the lower limit value of input voltage VI2 (output voltage of bypass AC power source 6) that can drive load 8 can be reduced by that amount. Since the remaining configuration and operation are the same as those of the first embodiment, description thereof will not be repeated.

In this fourth embodiment, the same effect as that of the first embodiment can be obtained and the lower limit value of input voltage VI2 (output voltage of bypass AC power source 6) that can drive load 8 can be reduced.

Although output voltage VDC2 of converter 56 is changed in accordance with the level of the amplitude of input voltage VI2 in this fourth embodiment, the present invention is not limited thereto. Output voltage VDC2 of converter 56 may be maintained at a certain value when input voltage VI2 is higher than a prescribed value, and output voltage VDC2 of converter 56 may be set at a greatest possible value when input voltage VI is lower than the prescribed value. By adjusting a difference between the phase of AC voltage VI2 and the phase of the timing of turning on and off switching elements S21 to S26, output voltage VDC2 of converter 56 can be adjusted to a desired value.

It should be understood that the embodiments disclosed herein are illustrative and non-restrictive in every respect. The scope of the present invention is defined by the terms of the claims, not the description above, and is intended to include any modifications within the meaning and scope equivalent to the terms of the claims.

REFERENCE SIGNS LIST 1 uninterruptible power supply apparatus; 2 operation unit; 3, 4, 40, 50, 55 power conversion device; L1 communication line; 5 commercial AC power source; 6 bypass AC power source; 7 battery; 8 load; T1 AC input terminal; T2 bypass input terminal; T3 battery terminal; T4 AC output terminal; 11, 16, 21, 37, 51, 53 electromagnetic contactor; 12, 15 fuse; 13, 19, 31, 35 AC reactor; 14, 32, 56 converter; 17, 33 smoothing electrolytic capacitor; 18, 34 inverter; 20, 36 capacitor; 22, 38, 57 controller; S1 to S6, S11 to S16, S21 to S26, S31 to S36 switching element; D1 to D6, D11 to D16, D21 to D26, D31 to D36 diode; 41 electric double layer capacitor; 52 semiconductor switch.

The invention claimed is:

1. An uninterruptible power supply apparatus comprising first and second power conversion devices,
the first power conversion device including:
 a first converter configured to convert AC power supplied from a first AC power source to DC power;
 a first inverter configured to convert DC power to AC power; and
 a first controller configured to control the first converter and the first inverter such that an output voltage of the first power conversion device becomes an AC voltage,
 when the AC power is supplied from the first AC power source, the DC power generated by the first converter being stored in a power storage device and supplied to the first inverter, and when the supply of the AC power from the first AC power source is stopped, the DC power of the power storage device being supplied to the first inverter,
the second power conversion device including:
 a second converter configured to convert AC power supplied from a second AC power source to DC power;
 a second inverter configured to convert the DC power generated by the second converter to AC power; and
 a second controller configured to control at least the second inverter, of the second converter and the second inverter, such that:
 (i) in a first case in which a DC voltage provided to the second inverter is higher than a predetermined first voltage, an output voltage of the second power conversion device becomes an AC voltage having a sinusoidal waveform and falling within an acceptable input voltage range of a load; and
 (ii) in a second case in which the DC voltage provided to the second inverter is lower than the predetermined first voltage, the output voltage of the second power conversion device becomes an AC voltage having waveform distortion within a range acceptable to the load and falling within the acceptable input voltage range of the load,
the AC power from any one of the first and second inverters being supplied to the load, and the AC power from the other inverter being supplied to the load when the one inverter has a malfunction.

2. The uninterruptible power supply apparatus according to claim 1, wherein
the predetermined first voltage is a minimum voltage required for the second power conversion device to output a lower limit AC voltage within the acceptable input voltage range of the load.

3. The uninterruptible power supply apparatus according to claim 1, wherein
the AC voltage having the waveform distortion has a trapezoidal waveform.

4. The uninterruptible power supply apparatus according to claim 1, wherein
in the first case, the second controller controls the second inverter such that the second inverter outputs a sinusoidal AC voltage having an amplitude smaller than one half of an amplitude of the DC voltage provided to the second inverter, and
in the second case, the second controller controls the second inverter such that the second inverter outputs a sinusoidal AC voltage having an amplitude greater than one half of the amplitude of the DC voltage provided to the second inverter.

5. The uninterruptible power supply apparatus according to claim 4, wherein
the second controller decreases a switching frequency of the second inverter in the second case to be lower than a switching frequency of the second inverter in the first case.

6. The uninterruptible power supply apparatus according to claim 1, wherein
the second converter includes a rectifier configured to rectify an AC voltage supplied from the second AC power source, and
the second controller controls the second inverter.

7. The uninterruptible power supply apparatus according to claim 1, wherein
the second converter includes a plurality of switching elements configured to convert an AC voltage supplied from the second AC power source to DC voltage, and
the second controller controls the second converter and the second inverter.

8. The uninterruptible power supply apparatus according to claim 1, wherein
the second power conversion device further includes an electric double layer capacitor configured to store the DC power generated by the second converter, and
when the AC power from the second AC power source is supplied, the DC power generated by the second converter is stored in the electric double layer capacitor and supplied to the second inverter, and when the supply of the AC power from the second AC power source is stopped, the DC power of the electric double layer capacitor is supplied to the second inverter.

9. The uninterruptible power supply apparatus according to claim 1, wherein
the second controller controls the second inverter such that a phase of the output voltage of the second power conversion device matches with a phase of the output voltage of the first power conversion device.

10. The uninterruptible power supply apparatus according to claim 1, wherein
the AC power from the first inverter is supplied to the load, and the AC power from the second inverter is supplied to the load when the first inverter has a malfunction.

11. The uninterruptible power supply apparatus according to claim 10, wherein
the second power conversion device further includes a switching circuit configured to receive the AC power supplied from the second AC power source and the AC power generated by the second inverter, and provide the load with the AC power generated by the second inverter when the second inverter is normal, and provide the load with the AC power supplied from the second AC power source when the second inverter has a malfunction.

12. The uninterruptible power supply apparatus according to claim 1, wherein the AC power from the second inverter is supplied to the load, and the AC power from the first inverter is supplied to the load when the second inverter has a malfunction.

13. The uninterruptible power supply apparatus according to claim 1, wherein when the AC power from the second AC power source is supplied, the AC power from the second inverter is supplied to the load, and when the supply of the AC power from the second AC power source is stopped, the AC power from the first inverter is supplied to the load.

14. The uninterruptible power supply apparatus according to claim 1, wherein a selected mode of a first mode and a second mode is executed, the first mode being a mode in which the AC power from the first inverter is supplied to the load, and the AC power from the second inverter is supplied to the load when the first inverter has a malfunction, and the second mode being a mode in which the AC power from the second inverter is supplied to the load, and the AC power from the first inverter is supplied to the load when the second inverter has a malfunction or when the supply of the AC power from the second AC power source is stopped.

15. The uninterruptible power supply apparatus according to claim 1, wherein the first controller controls the first converter and the first inverter such that the output voltage of the first power conversion device becomes a rated voltage having a sinusoidal waveform.

16. The uninterruptible power supply apparatus according to claim 1, wherein the first controller controls the first converter and the first inverter such that (i) the output voltage of the first power conversion device becomes a rated voltage having a sinusoidal waveform when the DC voltage provided to the first inverter is higher than a predetermined second voltage, and (ii) the output voltage of the first power conversion device becomes the AC voltage having the waveform distortion within the range acceptable to the load and falling within the acceptable input voltage range of the load when the DC voltage provided to the first inverter is lower than the second voltage.

17. The uninterruptible power supply apparatus according to claim 16, wherein the predetermined second voltage is a minimum voltage required for the first power conversion device to output a lower limit AC voltage within the acceptable input voltage range of the load.

18. The uninterruptible power supply apparatus according to claim 1, wherein the first controller controls the first converter and the first inverter such that (i) the output voltage of the first power conversion device becomes the AC voltage having the sinusoidal waveform and falling within the acceptable input voltage range of the load when the DC voltage provided to the first inverter is higher than a predetermined second voltage, and (ii) the output voltage of the first power conversion device becomes the AC voltage having the waveform distortion within the range acceptable to the load and falling within the acceptable input voltage range of the load when the DC voltage provided to the first inverter is lower than the second voltage.

19. The uninterruptible power supply apparatus according to claim 18, wherein the predetermined second voltage is a minimum voltage required for the first power conversion device to output a lower limit AC voltage within the acceptable input voltage range of the load.

\* \* \* \* \*